United States Patent [19]

Bart et al.

[11] 3,900,765

[45] Aug. 19, 1975

[54] HIGH VOLTAGE PULSE REGULATOR

[75] Inventors: Stanley Bart, Chicago; Raymond J. Magdziarz, Wood Dale, both of Ill.

[73] Assignee: Admiral Corporation, Schaumburg, Ill.

[22] Filed: June 11, 1973

[21] Appl. No.: 368,957

Related U.S. Application Data

[63] Continuation of Ser. No. 130,081, April 1, 1971, abandoned.

[52] U.S. Cl. .......... 315/411

[51] Int. Cl. .......... H01j 29/70

[58] Field of Search .......... 315/27 TD, 27 R, 28, 29, 315/310, 311, 307, 411; 323/22 V, 62, 60; 178/DIG. 11, 7.5 R, 5.4

[56] References Cited

UNITED STATES PATENTS

| | | | |
|---|---|---|---|
| 2,794,065 | 5/1957 | Dietch | 315/29 |
| 2,997,622 | 8/1961 | Claypool | 315/29 |
| 3,395,311 | 7/1968 | Hursh | 315/22 |
| 3,601,533 | 8/1971 | Lombard, III | 178/7.5 R |
| 3,629,644 | 12/1971 | Batavia | 315/22 |

*Primary Examiner*—Richard A. Farley
*Assistant Examiner*—J. M. Potenza

[57] ABSTRACT

A high voltage pulse regulator has its anode-cathode circuit shunted across the primary winding of an autotransformer for controlling the magnitude of the voltage developed. The secondary winding (high voltage winding of the autotransformer) is coupled to the primary through a series capacitor. A sensing diode connects the junction of the high voltage winding and capacitor to the input of the pulse regulator.

2 Claims, 1 Drawing Figure

PATENTED AUG 19 1975 3,900,765
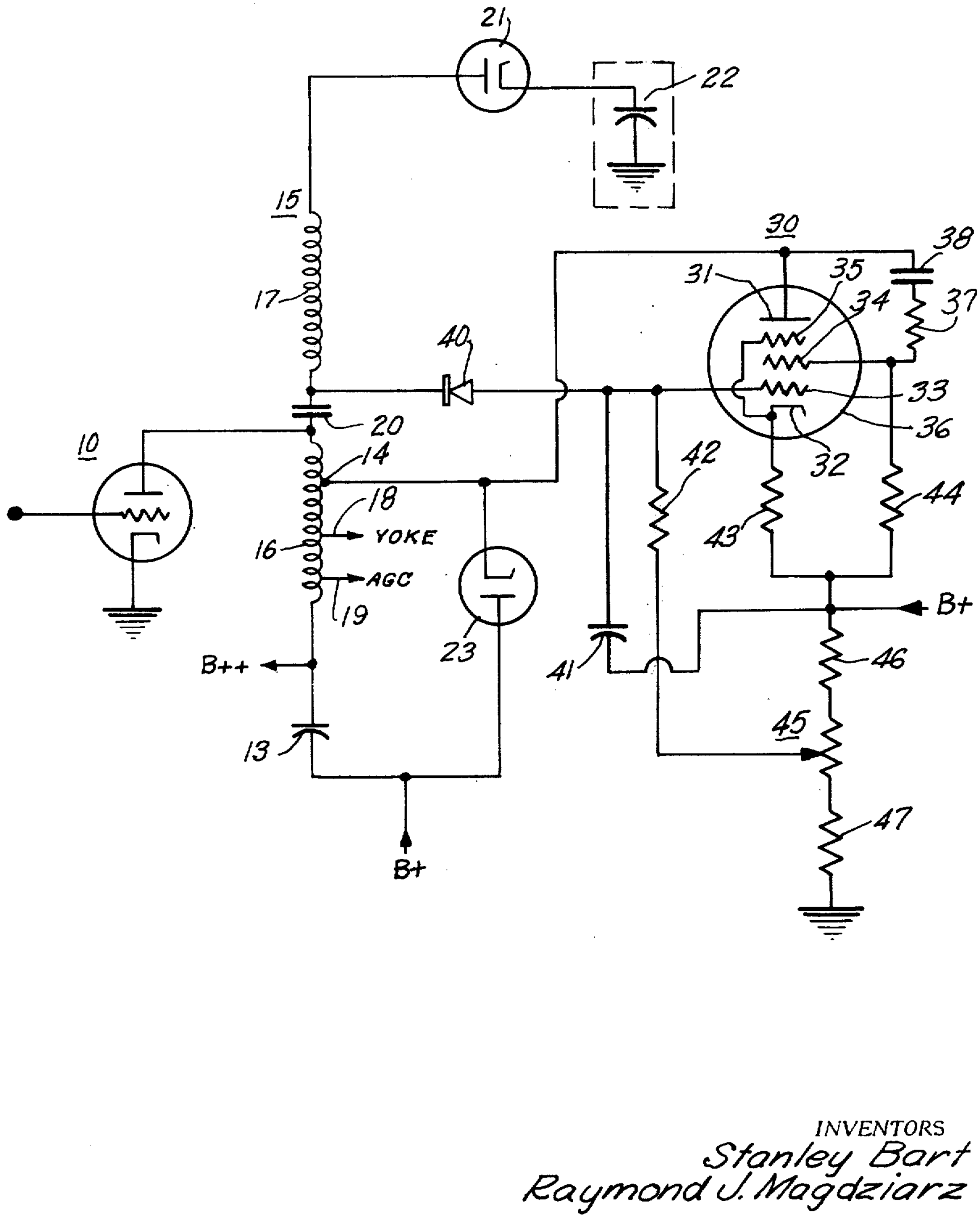
INVENTORS
Stanley Bart
Raymond J. Magdziarz
BY Nicholas A Camasto
ATTORNEYS

HIGH VOLTAGE PULSE REGULATOR

This is a continuation of application Ser. No. 130,081, filed Apr. 1, 1971, now abandoned

BACKGROUND OF THE INVENTION

It is common in the color television receiver industry to use high voltage regulation devices of the shunted type which absorb energy during periods of low brightness to maintain constant loading on the high voltage system. It has long been recognized that pulse type regulators offer many advantages, especially in view of the recent Government regulations regarding X-radiation from television receivers. Pulse regulator systems may be operated at relatively low voltage levels (below those which give rise to X-radiation concern), are much more accurate in holding voltage levels, and do not tax the high voltage system as much since high voltage rectifier current is supplied only when required by the video drive (brightness).

DESCRIPTION OF THE PRIOR ART

A number of regulation techniques use vacuum tubes driven by high voltage pulses taken from the autotransformer in a reaction-scan deflection system. Problems arise in the sensing arrangement whereby the input to the regulator is made responsive to the high voltage current requirements of the cathode ray tube (CRT). The autotransformer comprises a single winding, electrically, even though the terms primary and secondary are used to describe the portion in the horizontal output anode circuit and the high voltage portion, respectively. Inserting a sensing device below the tap for the anode of the horizontal output tube (in the primary winding) would render the regulator responsive to many other larger currents flowing in the winding, namely, those flowing in the damper circuit and in the horizontal output tube. Sensing between a point above the horizontal anode tap and ground would result in loss of the voltage developed across the primary winding as far as the high voltage was concerned, which in a typical example, is about 5000 volts. One prior art circuit solves this problem by adding a separate primary winding which is AC coupled to the high voltage winding. This technique is costly and completely alters the design of the high voltage transformer because of physical variations in winding sizes and dispositions. Other prior art techniques do not sense the high voltage directly but rather sense a voltage responsive to the scan voltage. Generally, the "boost" voltage is used. These arrangements are, of course, not as accurate or as sensitive as those which actually sense the CRT anode current.

SUMMARY OF THE INVENTION

The principal object of this invention is to provide a novel high voltage regulation system.

Another object of this invention is, in a reaction-scan deflection system, to provide means for sensing the direct current flowing in the high voltage winding of the autotransformer without losing the portion of high voltage developed across the primary winding.

An additional object of this invention is to provide a high voltage regulator having an input circuit which is traversed by the CRT anode current flowing in the system.

A further object of this invention is to provide a high voltage system for a television receiver incorporating diode sensing for passing the CRT anode direct current flowing in the autotransformer without substantially affecting the AC voltage developed across the primary thereof.

BRIEF DESCRIPTION OF THE DRAWINGS

The single FIGURE shows a partial schematic diagram of a reaction-scan type high voltage system for a television receiver incorporating a pulse regulator in accordance with the teachings of the invention.

DESCRIPTION OF THE PREFERRED EMBODIMENT

The drawing represents only the high voltage portion of a television receiver. It will be understood by those skilled in the art that any of numerous circuit configurations may be used for performing the functions of RF reception, amplification, heterodyning and detection.

A conventional horizontal output tube 10 is used to drive an autotransformer 15 with an oscillatory signal varying at the common television horizontal scanning frequency of 15.75 KHz. With the exception of high voltage regulating means 30, capacitor 20 and diode 40, the system is of the conventional reaction-scan type wherein the necessary potentials are derived for driving the deflection yoke (not shown) and high voltage rectifier 21. Autotransformer 15 comprises a primary winding 16 and a secondary winding 17. Primary winding 16 is connected to the anode of horizontal output tube 10 and through a boost voltage developing capacitor 13 to a source of B+ potential. The developed boost potential is indicated by the arrow labelled B++. A damper diode 23 is connected between a source of B+ potential and a tap 14 on primary winding 16. Winding 16 may also have a plurality of other taps, such as taps 18 and 19 labelled, respectively, YOKE and AGC. These taps signify the takeoff points for application of appropriate voltage to the indicated circuits.

Secondary winding 17 develops the bulk of the high voltage produced by the autotransformer. Assuming capacitor 20 were shorted, winding 17 would be directly connected to winding 16 at one end and to high voltage rectifier 21 at the other. During operation of the television receiver, rectifier 21 passes the high voltage pulse peaks developed across winding 17 and in conjunction with the capacitance of the picture tube (not shown) derives a CRT anode direction current. A capacitor 22, shown in a dashed line box, symbolically represents the capacitance between the outer and inner conductive coatings of the picture tube. As is well-known, the amount of high voltage current drawn by the picture tube is a direct function of the brightness of the image produced. Consequently, during scenes of high brightness, the high voltage current load is increased and the high voltage developed across the load (picture tube) decreases. Conversely, during scenes of low brightness, the CRT anode current load is small and the developed high voltage tends to increase.

High voltage regulator 30 comprises a pentode vacuum tube 36 having an anode 31, a cathodeo 32, a control grid 33, a screen grid 34 and a suppressor grid 35. Suppressor grid 35 is conventionally connected to cathode 32. Anode 31 of the high voltage regulator tube is connected to the cathode of damper tube 23 and high voltage regulator tube cathode 32 is returned through a resistor 43 to B+. Those skilled in the art will immediately recognize that the conductive path of the high voltage regulator tube is in parallel with damper 23 and, therefore, across a portion of winding 16. The high voltage regulator in fact operates as a damper, and, if driven into heavy conduction, tends to suppress the high voltage developed across autotransformer 15. If the regulator tube is not driven heavily conductive, the loading across the primary winding is decreased with a consequent increase in the voltage developed across the autotransformer. Screen grid 34 is supplied B+ through a resistor 44. The RC network comprising resistor 44 and a capacitor 38 is connected as a differentiator to shape the keying pulse supplied from tap 45 to screen grid 34, which controls turns on of tube 36. A small resistor 37 is used to suppress any parasitic oscillation occurring at the screen grid. A voltage divider network comprising a pair of resistors 46 and 47 and a potentiometer 45 is connected between B+ and ground. The tap of potentiometer 45 is connected through a resistor 42 to control grid 33 of the high voltage regulator tube and, as will be seen, sets the bias level thereon, which in turn determines the high voltage level of the system.

Since the output circuit of the high voltage regulator is in parallel with the damper tube, it will be seen that the regulator would control the voltage developed in autotransformer 15 through a variable damping action, provided its input could be made responsive to the high voltage.

Reverting to the figure as it is, a capacitor 20 is serially inserted between windings 16 and 17. This capacitor is selected to have a value large enough to provide sufficient AC coupling between windings 16 and 17 to pass high voltage pulses but to prohibit DC current flow therethrough. The junction of capacitor 20 and secondary winding 17 is connected, through a diode 40, to control grid 33 of high voltage regulator tube 36. The polarity of diode 40 is selected such that a DC current path exists therethrough during conduction of high voltage rectifier 21. A bypass capacitor 41 is connected from control grid 33 to B+ to minimize the influence of stray voltage pulses on regulator tube operation.

The voltage developed at grid 33 is determined by the current flowing through resistor 42. This resistor is in the high voltage direct current path and its potential drop is a direct function of the CRT anode current flowing in the system. As the CRT anode current increases, the potential drop across resistor 42 increases which tends to drive grid 43 more negative. Conduction in regulator tube 36 is decreased, which "undamps" the system thereby tending to increase the potential developed across autotransformer 15. As the CRT anode current drawn through winding 17 decreases, the voltage drop across resistor 42 decreases and regulator tube 36 is driven harder thus "damping" winding 16 and precluding a rise in voltage developed across the autotransformer. No CRT anode direct current is allowed to flow through primary winding 16. Consequently, the junction of diode 40 and capacitor 20 may be at a very high AC potential (approximately 5KV) and the full AC voltage across the autotransformer contributes to the system voltage. This same junction point is, however, at a substantially lower DC potential level during the scan interval. Thus the sensing circuit is made responsive to the actual high voltage current in the system without sacrificing the voltage developed across the primary winding.

The embodiments of the invention in which an exclusive property or privilege is claimed are defined as follows:

1. In a color television receiver including a picture tube: a high voltage system comprising an autotransformer having a first winding and a second winding; a first capacitor connected between said first and second windings; an amplifier connected to said first winding for driving said transformer with an oscillatory signal; a deflection yoke coupled to said first winding; a damper connected across a portion of said first winding cooperating with said amplifier and deflection yoke to produce a scan voltage having a waveform characterized by a slowly rising trace portion and a rapidly decaying retrace portion; rectifying means coupled to said second winding developing high voltage DC current for said picture tube; a sensing diode with one side connected to the junction between said second winding and said first capacitor, a voltage regulating vacuum tube with its control grid connected to the second side of said sensing diode; a first resistor connected between the cathode and control grid of said voltage regulating vacuum tube; a second capacitor; and a second resistor connected in series with said second capacitor between the anode and cathode of said voltage regulating vacuum tube to shape keying pulse.

2. In a color television receiver according to claim 1 wherein said first resistor is variable to allow the bias on said vacuum tube to be varied.

* * * * *